United States Patent [19]
Perisho et al.

[11] Patent Number: 5,477,746
[45] Date of Patent: Dec. 26, 1995

[54] PARKING BRAKE LEVER MECHANISM WITH LOBE MOTION AMPLIFYING MEANS

[75] Inventors: Randal J. Perisho; Harold L. Carlson, both of Moberly, Mo.

[73] Assignee: Dura Automotive Systems, Inc., Troy, Mich.

[21] Appl. No.: 215,027

[22] Filed: Mar. 21, 1994

[51] Int. Cl.⁶ ............................................ G05G 1/14
[52] U.S. Cl. ................... 74/512; 74/516; 74/501.5 R;
   74/542; 74/567; 74/518; 74/560
[58] Field of Search .......................... 74/523, 535, 528,
   74/538, 512, 567, 569

[56] References Cited

U.S. PATENT DOCUMENTS

| | | | |
|---|---|---|---|
| 3,487,716 | 1/1970 | Hirst | 74/516 |
| 4,770,057 | 9/1988 | Foggini | 74/523 |
| 4,841,798 | 6/1989 | Porter et al. | 74/501.5 R |
| 4,850,242 | 7/1989 | Hass et al. | 74/512 |
| 4,881,424 | 11/1989 | Clark et al. | 74/535 X |
| 5,004,077 | 4/1991 | Carlson et al. | 74/501.5 R |
| 5,235,867 | 8/1993 | Wortmann et al. | 74/536 |
| 5,275,262 | 1/1994 | Ojima et al. | 188/82.6 |
| 5,303,610 | 4/1994 | Noel et al. | 74/523 X |
| 5,351,573 | 10/1994 | Cicotte | 74/512 |

FOREIGN PATENT DOCUMENTS

| | | | |
|---|---|---|---|
| 0569053 | 11/1993 | European Pat. Off. | 74/512 |
| 2645982 | 4/1978 | Germany | 74/523 |
| 3900661 | 7/1990 | Germany | 74/523 |
| 2-68257 | 3/1990 | Japan | 74/523 |
| 5-185912 | 7/1993 | Japan | 74/512 |
| 786426 | 11/1957 | United Kingdom | 74/523 |

*Primary Examiner*—Vinh T. Luong
*Attorney, Agent, or Firm*—Laubscher & Laubscher

[57] ABSTRACT

The improved parking brake lever arrangement includes a pair of cooperating lobe members for effecting a mechanical advantage between the operating lever and the parking brake cable, use being made of a spring clutch associated with the drive lobe member for locking the lever in the brake-applied position, and a self-adjust device associated with the driven lobe member for removing cable slack when the operating lever is in the brake-released position. In the preferred embodiment, the lobe members comprise lobe cams that are connected by a flexible strap or belt that extends between the cooperating cam surfaces and is secured at opposite ends to the cams, respectively.

12 Claims, 4 Drawing Sheets

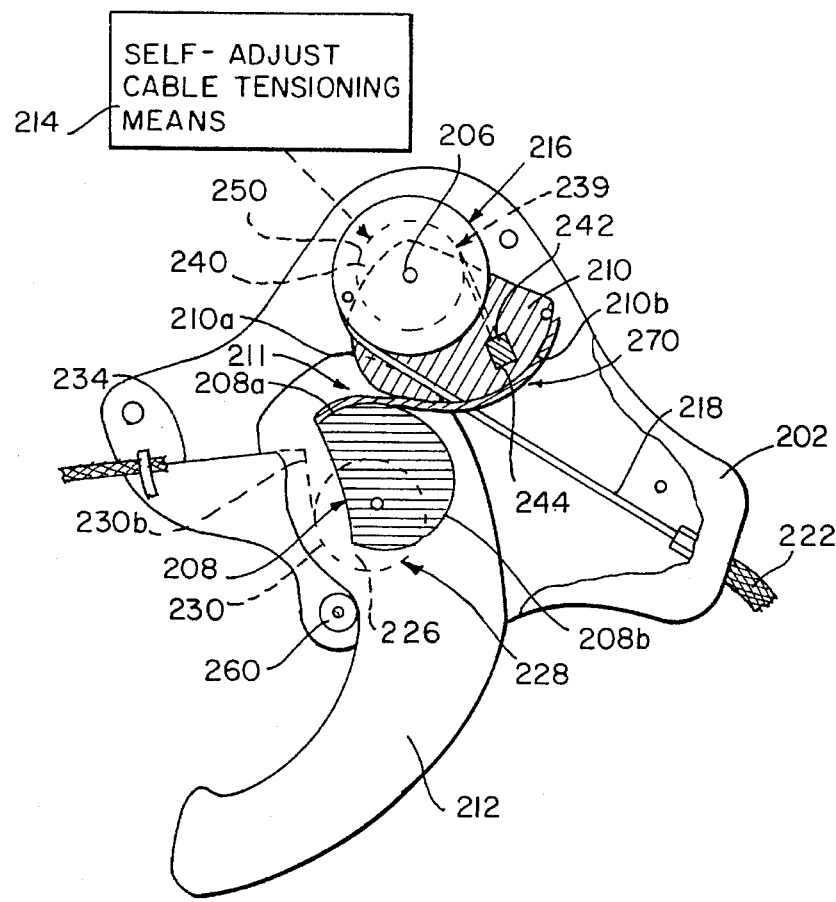
FIG.7
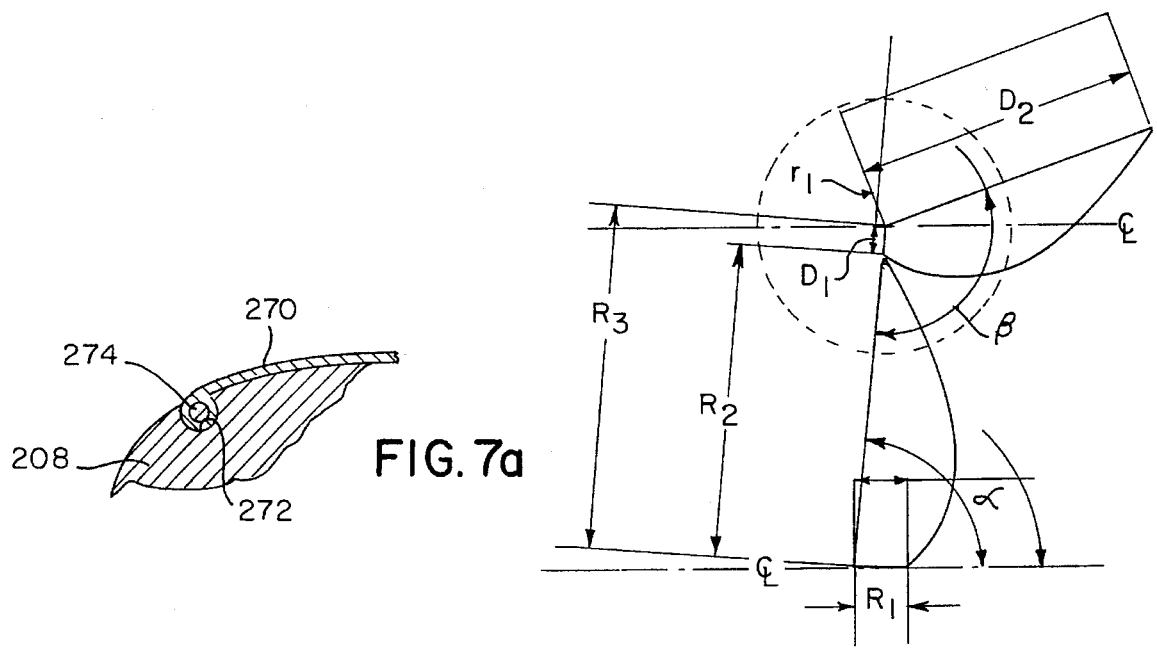
FIG.7a
FIG.8

PARKING BRAKE LEVER MECHANISM WITH LOBE MOTION AMPLIFYING MEANS

FIELD OF THE INVENTION

An improved parking brake lever mechanism is disclosed having lobe cam or lobe gear motion amplifying means for producing progressively increasing parking brake cable tension for increments of movement of the operating lever. Releasable spring clutch means are provided on a drive lobe member for locking the operating lever in a brake-applied position, and self-adjust cable tensioning means are associated with the driver lobe member for automatic operation when the operating lever is in the brake-released position, thereby to reduce the size, weight, complexity and cost of the parking brake mechanism.

BRIEF DESCRIPTION OF THE PRIOR ART

As evidenced by the prior Hirst U.S. Pat. No. 3,487,716—which is assigned to the same assignee as the present invention—it is known in the parking brake lever mechanism art to use a pair of cooperating elliptical gears in combination with toggle means to achieve a desired parking brake performance, such as the initial application of a low mechanical advantage ratio to the cable actuator to rapidly take up cable slack and stretch, and subsequently exhibit a high mechanical advantage ratio to achieve high brake cable stress during final travel of the brake cable. As shown in FIG. 1, during pivotal movement of the parking brake lever 12 in the clockwise brake-applying direction from the illustrated brake-released condition toward the brake-applied condition shown in phantom, driven elliptical gear 16 and cable track member 23 are pivoted through a correspondingly greater angle than that of the lever 12, owing to the mechanical advantage afforded by the relative configurations of the elliptical gears. More particularly, as shown in FIG. 2, the elliptical gearing arrangement affords low mechanical advantage ratio during initial brake lever travel to rapidly take up cable slack and stretch, and subsequently to provide high mechanical advantage ratio during and through final travel of the lever. FIG. 3 is a graphical illustration of the operation of the elliptical gears.

In the Hass et al U.S. Pat. No. 4,850,242 (assigned to the same assignee), the use of spring clutch means is disclosed in a parking brake lever arrangement have self-adjust means for automatically removing slack from the cable when the operating lever is in the brake released position. Other cable tension adjusting arrangements are disclosed in the patents to Wortmann et al U.S. Pat. No. 5,235,867, Carlson et al U.S. Pat. No. 5,004,077 and Porter et al U.S. Pat. No. 4,841,798.

While the known parking brake arrangements operate generally satisfactorily continued efforts are made to reduce the size, weight, complexity and cost of the systems while at the same time improving their reliability, durability and ease of installation and maintenance, together with improved operating performance.

SUMMARY OF THE INVENTION

Accordingly, a primary object of the present invention is to provide an improved parking brake lever arrangement including cooperating driving and driven lobe members for affording a mechanical advantage to produce a desired performance curve, releasable spring clutch means being associated with the driving lobe member for locking the operating lever in the brake-applied position, and self-adjust cable-tensioning or slack removing means being associated with the driven lobe member for automatic operation when the operating lever is in the brake-released position, thereby to reduce the size weight, number of parts, complexity and cost of the apparatus.

In a preferred embodiment of the invention, the lobe members comprise a pair of lobe cams that are connected by a flexible belt or strap that extends between the cooperating cam surfaces of the lobe cams. In a second embodiment, the lobe members comprise a pair of lobe gears having continuously cooperating gear teeth.

According to a more specific object of the invention, the parking brake mechanism may be provided with a desired performance curve as a consequence of the logarithmic configurations of the cooperating lobe members and, in the case of the embodiment using lobe cams, the length of the flexible connecting strap or band. A wide range of ratio/travel curves are possible, and the lobe members may be replaced to change the ratio/travel curves as desired. Fewer parts are required, and the possibility presents itself of forming certain of the parts (as for example, the operating lever and the drive lobe member) as a single integral member, thereby resulting in a significant cost reduction. Cable travels and ratios have been achieved with the present invention that were not possible with the known parking brake arrangements.

BRIEF DESCRIPTION OF THE DRAWINGS

Other objects and advantages of the invention will become apparent from a study of the following specification when viewed in the light of the accompanying drawings in which:

FIG. 7(7a) is a diagrammatic sectional view of a second preferred embodiment of the invention when in the brake-released condition, and FIG. 7a is a detailed sectional view of the band-fastening means of FIG. 7;

FIGS. 8–10 are graphs illustrating the operation of the invention of FIG. 7.

DETAILED DESCRIPTION

Figure 4:
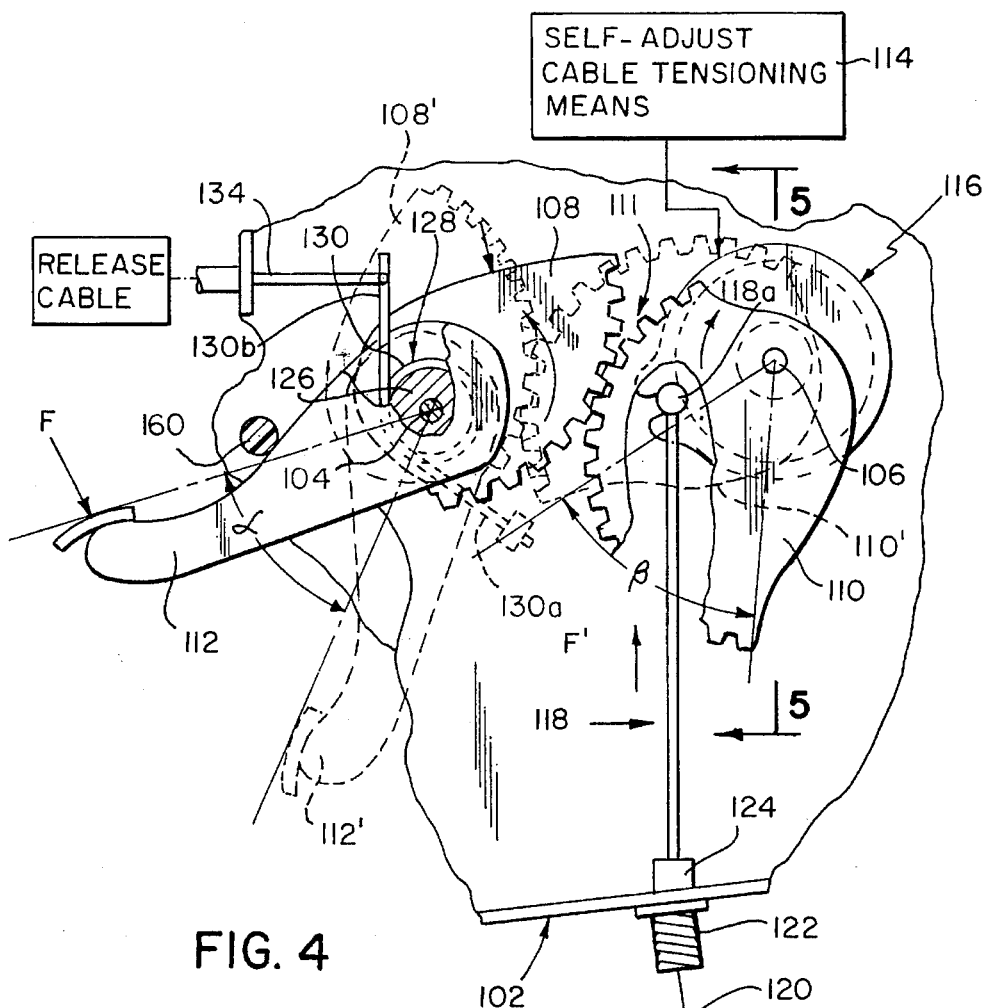
FIG. 4 is a diagrammatic representation with certain parts removed, of a first embodiment of the parking brake lever arrangement of the present invention when in the brake-released condition.
Figure 5:
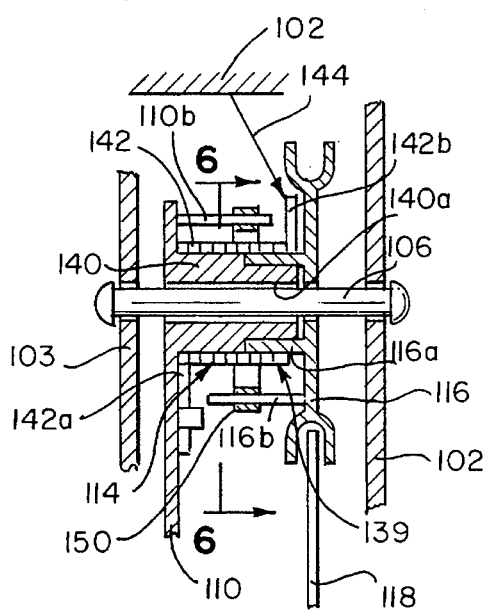
FIG. 5 is a sectional view taken along the line 5—5 of FIG. 4.
Figure 6:
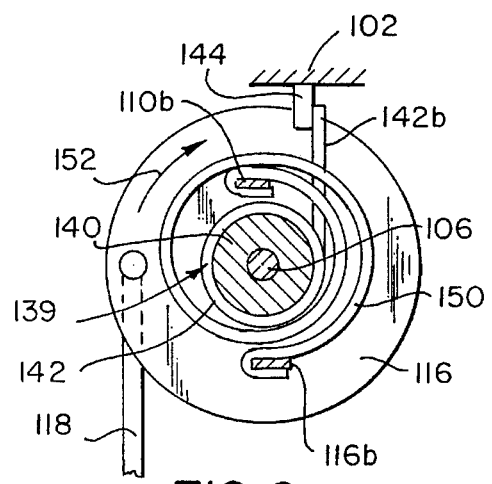
FIG. 6 is a sectional view taken along line 6—6 of FIG. 5.

Referring now to FIGS. 4–6, in accordance with a first embodiment of the present invention, an improved parking brake lever arrangement is provided including a mounting bracket or housing 102 to which are pivotally connected for movement about pivot axes 104 and 106 a pair of lobe or elliptical gears 108 and 110, respectively, which define motion-amplifying means 111. The elliptical gear 108 is a drive gear secured to the parking brake foot lever 112 that is also pivotable about pivot axis 104. Elliptical gear 110 is a driven gear the teeth of which are in continuous engagement with the teeth of driving gear 108. The driven gear 110 is releasably connected by self-adjust cable tensioning means 114 with cable track member 116 to which is connected one end 118a of the inner strand member 118 of parking brake cable 120. The outer conduit cable member 122 is connected with bracket 102 by a conventional snap-fit connector 124. Secured to the driven gear 108 concentrically about the pivot shaft 104 is the cylindrical drum member 126 of first one-way spring clutch locking means 128 including a helical clutch spring 130. At one end the clutch spring includes a first tangentially-extending leg 130a that is anchored with the mounting bracket 102, and at its other end, the clutch spring includes a tangentially-extending leg 130b that is operated by release cable 134. The helical turns of the clutch spring 130—which are normally in frictional engagement with the outer periphery of the drum 126—are in such a direction as to permit free pivotal movement of the foot lever 112 in the counter-clockwise parking-brake-applying direction, but which prevent rotational movement of the drum, and pivotal movement of the lever, in the opposite direction, as is known in the art. Operation of the release leg 130b upon retraction of the release cable 134 permits return movement of the foot lever 112 in the clockwise direction toward the brake-released position of FIG. 4.

Referring to FIG. 5, the self-adjust cable tensioning means 114 comprises second one-way spring clutch locking means 139 including a clutch spring drum 140 that is secured to the driven elliptical gear 110, which drum 140 and gear 110 are journalled on the pivot pin 106 that extends between mounting bracket 102 and the opposed spaced position of cover member 103. The drum includes an end portion 140a of reduced diameter upon which is journalled the tubular hub portion 116a that is integral with, and extends axially from, the cable guide track member 116. Helical clutch spring 142 includes a first tangential leg portion 142a that is anchored to the driven gear 110, and a second tangential release leg portion 142b that is arranged for engagement with stationary abutment 144 on bracket 102, as best shown in FIG. 6. The turns of the helical clutch spring 142 are normally in frictional engagement with the outer peripheral surfaces of the drum 140 and the hub portion 116a (which have the same outer diameter), and in such a direction as to normally prevent movement of the cable track member 116 in the counter-clockwise cable-tension-releasing direction relative to driven gear 110. Mounted in concentrically spaced relation about the helical spring 142 is a spiral spring 150 the inner and outer ends of which are connected with axially-extending projections 110b and 116b on the driven gear 110 on the guide track 116, respectively. The ends of the spiral spring normally react to bias the cable track member 116 in the cable-tension-applying clockwise direction relative to the driven gear 110, as shown by the arrow 152 in FIG. 6.

Operation

Assuming that the parking brake lever mechanism is initially in the brake-released condition of FIG. 4, upon the application of a downwardly directed force F to the pedal portion of the foot operated lever 112, drive gear 108 is pivoted in the counter-clockwise direction, overcoming the frictional resistance between the helical turns of spring 130 and drum 126. Driven gear 110 is pivoted in the clockwise direction as a consequence of the engagement between the gear teeth, and owing to the tight engagement between the helical turns of spring 142 with the peripheries of drum 140 and hub portion 116a, the cable track member 116 is similarly rotated in the clockwise direction to apply tension to the parking brake cable 118. Owing to the configuration of the elliptical gears 108 and 110, during pivotal movement of the lever 112 in the brake applying direction, the effective radius of drive gear 108 decreases, and the effective radius of driven gear 110 increases, thereby to produce a mechanical advantage that results in the application of an increased tensioning force F' to the parking brake cable 118. Upon the release of force F on the pedal of lever 112, lever 112 is locked in the brake-applied applied position (show in phantom in FIG. 4) owing to the cooperation between the turns of helical spring 130 and the outer periphery of drum 126.

Upon the retraction of release cable 134, spring leg 130b is displaced to the left to expand the turns of spring 130, thereby to release drum 126, whereby owing to the tension of brake cable 118, cable track member 116 and gear 110 are pivoted in the counter-clockwise direction, and gear 108 and lever 112 are pivoted in the clockwise direction, until lever 112 returns to the brake-released position of FIG. 4 and abuts the stationary resilient bumper 160 on the mounting bracket 102. At this time, spring leg 142b of spring 142 is brought into engagement with stationary abutment 144 on the mounting bracket, and leg 142b is operated to expand the turns of spring 142 and thereby disconnect cable track member 116 from driven gear 110. Spring 150 now expands to rotate cable track member 116 in the clockwise direction relative to driven gear 110, thereby to remove slack from cable 118. Upon reapplication of the parking brake lever 112, spring leg 142b is displaced away from abutment 144, and cable track member 116 is again connected with driven gear 110 for simultaneous movement therewith in the clockwise direction.

Referring now to the preferred embodiment of the invention illustrated in FIGS. 7–10, a pair of lobe or logarithmic cams 208 and 210 are substituted for the driving and driven elliptical gears 108 and 110, respectively, of the embodiment of FIG. 4. The driving cam 208 is secured to the foot operated lever 212 and the driven cam 210 is connected with the cable track member 216 via the self-adjust cable tensioning means 114. The cams are connected via the flexible belt or strap 270 that extends between, and is connected at opposite ends with, the cams 208 and 210, respectively. The cams may are preferably die cast from aluminum (such as aluminum A-380) or from a zinc aluminum alloy (such as ZA-8). The flexible belt is secured to the cams by means of rivets, or by means of grooves 272 formed in the cams for receiving looped end portions of the bands and retaining pins 274. Preferably, the belt 270, is formed from high carbon spring steel, such as 1075 carbon steel having a yield strength of about 230,000 psi yield strength. Alternatively, the flexible belt could be formed from a suitable synthetic plastic material such as Kelvar, or a fiberglass-reinforced thermoplastic elastomer fortified with strands of fibers. The belt has a thickness of on the order of 0.002"to 0.040", and a width of from about 0.2"to about 1.0". The length of the belt and the specific configuration of the cooperating lobe cam surfaces are selected to afford a desired operating parking brake operating condition, as will be described below.

To reduce the cost of the parking brake mechanism, the operating lever 212 and the driving lobe cam 208 may be formed (for example, by die-casting) as a single unit. While on the one hand the lever and driving cam could be formed by stamping as a unit from stamped steel, it is preferable to die cast the lever and the drive lobe cam as a unit from aluminum, or a suitable thermoplastic synthetic plastic material, such as a "long fiber" nylon (i.e., Nylon 4–6 or Nylon 6-6). The drum member of the associated first spring clutch means 228 could similarly be formed integrally with lever 212.

Figure 9:
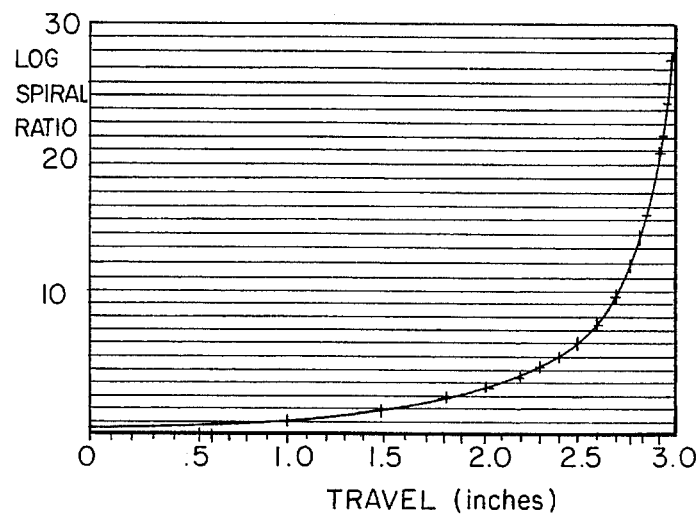
Figure 10:
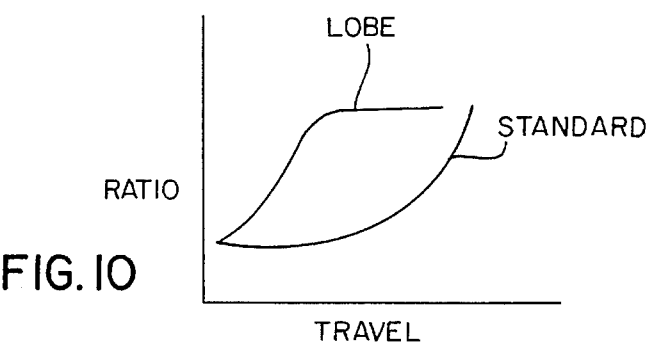

Referring to FIGS. 8 and 9, the lobe or logarithmic cams 208 and 210 may be readily designed to provide any desired performance curve. In FIG. 8, for a given angular motion $\alpha$ of the drive cam 208, a larger output angle $\beta$ of the driven cam 210 is produced. Thus, assume that for a 3 inch travel (in FIG. 9) of the parking brake cable 218:

$R_1 = .612$ inch
$R_2 = 3.700$ inch
$D_1 = .300$ inch
$D_2 = 3.388$ inch
$\alpha = 85.000$ degrees
$\beta = 114.592$ degrees
pedal length = 7.500 inch
pivot centerline distance = 4,199 $(R_2 + D_1 + .100)$
cable track radius $r_1 = 1.5$ inch The size ratio is:

$$\frac{R_1}{D_1} = \frac{.612}{.300} = 2.043$$

The initial log spiral ratio is:

$$LSR_{in} = \frac{\text{pedal length}}{R_2} \times \frac{D_1}{\text{cable track radius}}$$

$$= \frac{7.500}{3.700} \times \frac{.300}{1.500} = .405$$

The final log spiral ratio is:

$$LSR_{fin} = \frac{\text{pedal length}}{R_1} \times \frac{D_2}{\text{cable track radius}}$$

$$= \frac{7.5}{.612} \times \frac{3.388}{1.500} = 27.662$$

The radius changes in accordance with the logarithmic function:
$r = a \cdot e^{hc\theta}$ where a, e, h and c are constants, and $\theta$ is the output angle of driven cam 210.

Thus, as shown in FIG. 9, for an input force of 100 lb. effort on the parking brake pedal, the output forces on the cable 218 are:

| Cable Travel (inches) | Output Force (lb) |
|---|---|
| 1.0 | 100 |
| 1.5 | 160 |
| 2.0 | 300 |
| 2.5 | 800 |
| 3.0 | 2700 |

Consequently, applicant's novel lobe and flexible belt arrangement produces for small increments of movement of the parking brake lever 212 a tremendous amount of tension in the cable 218.

Figure 1:
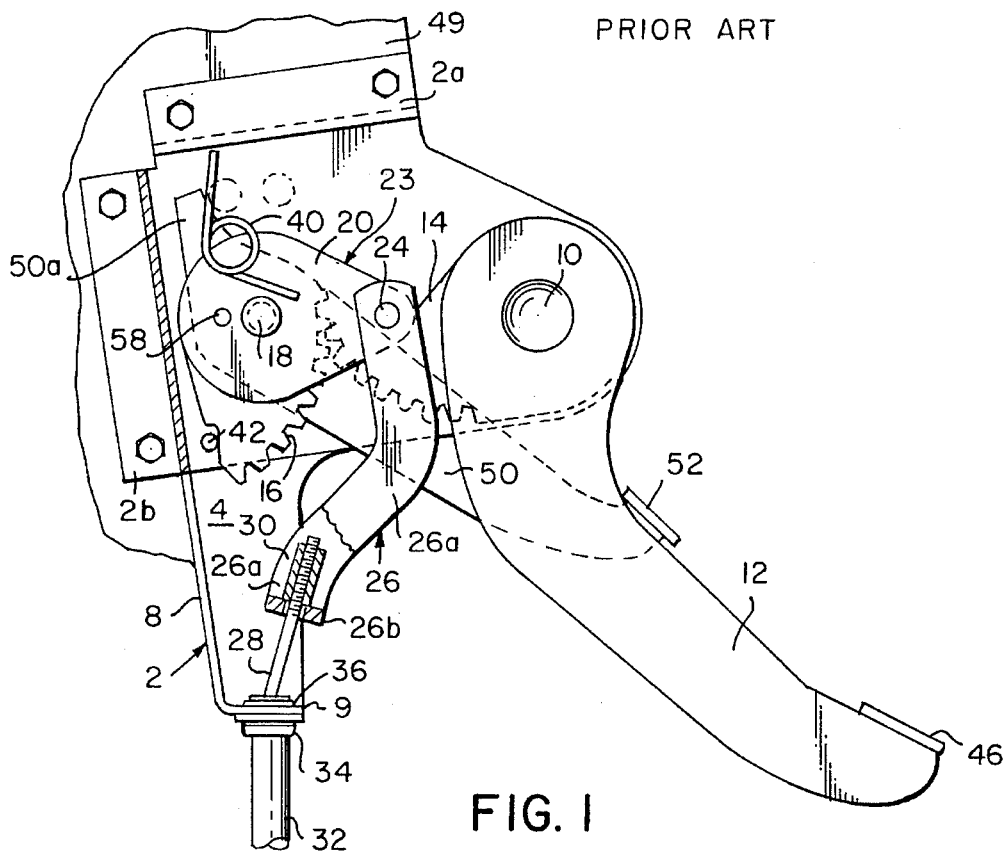
FIGS. 1–3 illustrate a parking brake lever arrangement of the prior art, as illustrated by the Hirst U.S. Pat. No. 3,487,716.
Figure 2:
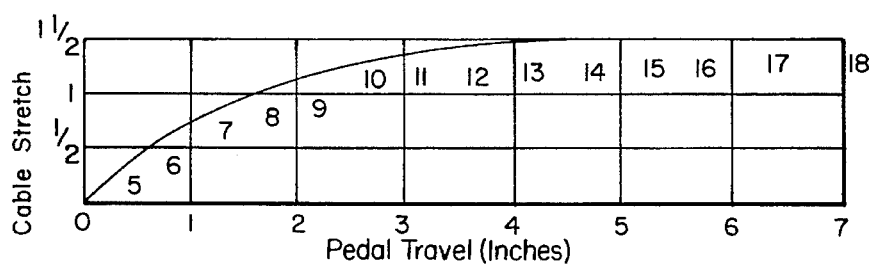
Figure 3:
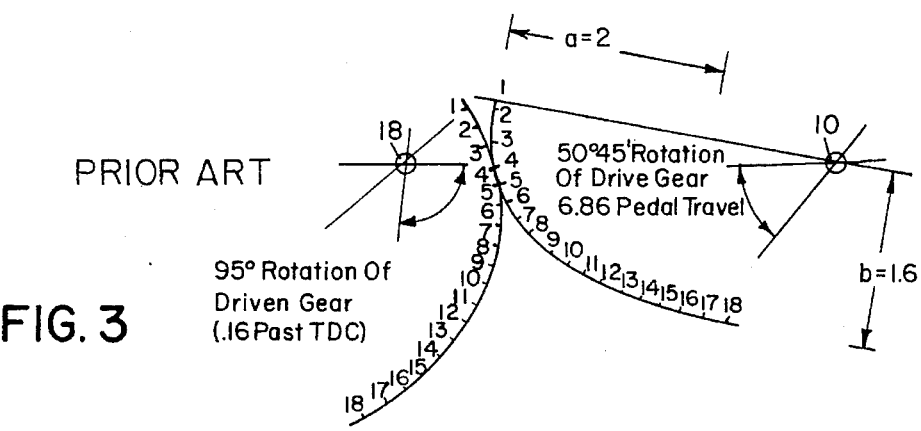

By use of the lobe cam and belt arrangement of the preferred embodiment of the invention, the high contact stress of the gear teeth of the FIG. 1 and 4 embodiments is avoided, together with the elimination of tooth wear and drag. Flexibility of parking brake performance and wider ranges of ratio/travel curves are readily achieved by means of either variations in cam lobe configuration and/or flexible belt length (FIG. 10), and the problems of close tolerances and clearances required by the prior embodiments are avoided. Fewer parts are required in the embodiments of FIGS. 4 and 7 over the prior art embodiment of FIG. 1, greatly reducing the number of parts and the resulting assembly cost of the parking brake lever assembly. Further reduction of cost is achieved by forming the operating lever and the drive cam of FIG. 7 as a single part.

Figures 11, 12, 13:
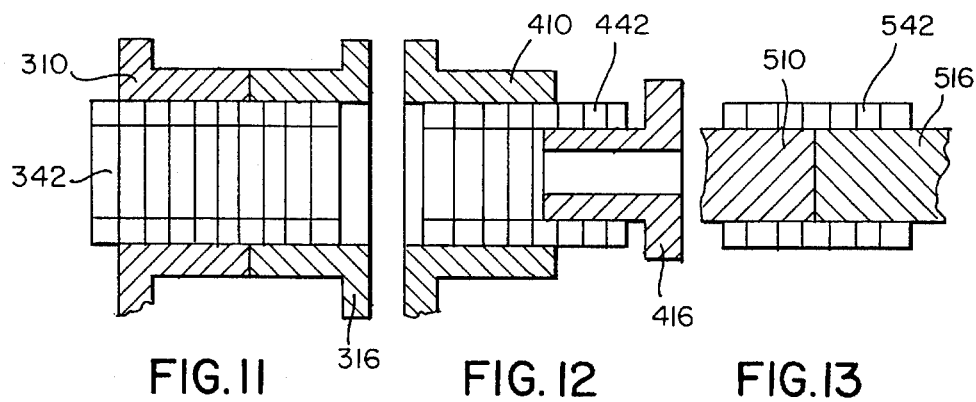
FIGS. 11–13 are detailed sectional views of various modifications of the spring clutch means of FIG. 5.

In FIGS. 11–13, variations of the spring clutch arrangement are shown in which the helical spring turns extend concentrically within, concentrically within and about, and concentrically about the corresponding drum surfaces, respectively. While the tension spring 150 of FIG. 5 has been illustrated as being a spiral spring, it is obvious that a helical torsion spring could be used as well. Also, while the main locking means has been illustrated as being located on the operating lever, it could be provided on the output cam, if desired. The locking means could also be of the ratchet and pawl type, or the ramp and roller type, as is known in the art.

According to a further feature of the invention, the cams 208 and 210 have first portions 208a and 210a that have varying radii for providing the desired motion amplification, and second portions 208b and 210b of constant radii for providing constant ratios for extra travel.

While in accordance with the provisions of the Patent Statutes the preferred forms and embodiments have been illustrated and described, it will be apparent that various changes and modifications may be made without deviating from the inventive concepts set forth above.

What is claimed is:

1. Vehicle parking brake cable operating means, comprising:

(a) a mounting bracket (102;202) adapted for connection with a vehicle having a parking brake cable;

(b) a parking brake lever (112;212) pivotally connected with said bracket for movement about a first pivot axis (104;204) between a brake-released first position and a brake-applied second position;

(c) a cable track member (116;216) connected with said bracket for pivotal movement about a second pivot axis (106,206), said cable track member being adapted for connection with one end of the parking brake cable (118;218);

(d) motion-amplifying means (111;211) including a pair of cooperating lobe members (108,110; 208,210) for producing in response to pivotal movement of said lever through a given first angle ($\alpha$) in the direction from said brake-released first position toward said brake-applied second position a corresponding pivotal movement of said cable track member through a greater second angle ($\beta$) relative to said mounting bracket in a first direction, thereby to produce a mechanical advantage that results in an increased tension of the brake cable; and (e) self-adjust cable tensioning means (114,214) associated with a first one of said lobe members for initially disconnecting said cable track member from said motion amplifying means when said lever is pivoted in the opposite direction from said brake-applied second position to said brake-released first position, and for subsequently biasing said cable track member in said cable-tensioning first direction relative to said motion amplifying means, thereby to remove slack from the cable.

2. Vehicle parking brake operating means, comprising:

(a) a mounting bracket (102;202) adapted for connection with a vehicle having a parking brake cable;

(b) a parking brake lever (112;212) pivotally connected with said bracket for movement about a first pivot axis (104;204) between a brake-released first position and a brake-applied second position;

c) a cable track member (116;216) connected with said bracket for pivotal movement about a second pivot axis (106,206), said cable track member being adapted for connection with one end of the parking brake cable (118;218);

d) motion-amplifying means (111;211) including a pair of cooperating lobe members (108,110; 208,210) for producing in response to pivotal movement of said lever through a given first angle ($\alpha$) in the direction from said brake released first position toward said brake applied second position a corresponding pivotal movement of said cable track member through a greater second angle ($\beta$) relative to said mounting bracket in a first direction, thereby to produce a mechanical advantage that results in an increased tension of the brake cable; and e) self-adjust cable tensioning means (114,214) associated with a first one of said lobe members for initially disconnecting said cable track member from said motion amplifying means when said lever is pivoted in the opposite direction from said brake-applied second position to said brake-released first position, and for subsequently biasing said cable track member in said cable-tensioning first direction relative to said motion amplifying means, thereby to remove slack from the cable; and f) first one-way locking means (128;228) associated with the other one of said lobe members for normally permitting pivotal movement of said lever relative to said bracket only in the direction from said brake-released first position toward said brake-applied second position, and release means (134,234) for releasing said first locking means, thereby to permit pivotal movement of said lever in the opposite direction.

3. Apparatus as defined in claim 2, wherein said first one-way locking means comprises a first spring clutch (126,130; 226,230).

4. Apparatus as defined in claim 3, wherein said self-adjust cable tensioning means includes second one-way locking means (139;239) normally connecting said cable track member against movement in the cable tension releasing direction relative to said motion amplifying means.

5. Apparatus as defined in claim 4, wherein said second one-way locking means comprises a second spring clutch (140,142; 240,242).

6. Apparatus as defined in claim 5, wherein said self-adjust cable tensioning means further includes spiral spring means (150,250) normally biasing said cable track member in the cable-tensioning first direction relative to said motion amplifying means.

7. Apparatus as defined in claim 2, wherein said motion amplifying members comprise a pair of lobe cams (208,210) connected with said lever and with said cable track member, respectively, said lobe cams having cooperating cam surfaces, and connecting means (270) connecting together said lobe cams.

8. Apparatus as defined in claim 7, wherein said lobe cam connecting means comprises a flexible belt extending between said cam surfaces, and means connecting the ends of said belt with said cams, respectively.

9. Apparatus as defined in claim 8, wherein said flexible belt is formed from high carbon steel.

10. Apparatus as defined in claim 8, wherein said flexible belt is formed from a fiberglass-reinforced synthetic plastic elastomer.

11. Apparatus as defined in claim 8, wherein said flexible belt is formed of Kevlar.

12. Apparatus as defined in claim 2, wherein said motion amplifying members comprise a pair of lobe gears having constantly enmeshing teeth.

* * * * *